US011053564B2

(12) United States Patent
Goto et al.

(10) Patent No.: US 11,053,564 B2
(45) Date of Patent: *Jul. 6, 2021

(54) HIGH STRENGTH THICK-WALLED ELECTRIC-RESISTANCE-WELDED STEEL PIPE FOR DEEP-WELL CONDUCTOR CASING, METHOD FOR MANUFACTURING THE SAME, AND HIGH-STRENGTH THICK-WALLED CONDUCTOR CASING FOR DEEP WELLS (71) Applicant: JFE STEEL CORPORATION, Tokyo (JP)

(72) Inventors: Sota Goto, Kawasaki (JP); Takatoshi Okabe, Handa (JP); Yukihiko Okazaki, Handa (JP)

(73) Assignee: JFE STEEL CORPORATION, Tokyo (JP)

( * ) Notice: Subject to any disclaimer, the term of this patent is extended or adjusted under 35 U.S.C. 154(b) by 304 days.

This patent is subject to a terminal disclaimer.

(21) Appl. No.: 15/539,510

(22) PCT Filed: Dec. 15, 2015

(86) PCT No.: PCT/JP2015/006232
§ 371 (c)(1),
(2) Date: Jun. 23, 2017

(87) PCT Pub. No.: WO2016/103623
PCT Pub. Date: Jun. 30, 2016

(65) Prior Publication Data
US 2017/0362678 A1 Dec. 21, 2017

(30) Foreign Application Priority Data
Dec. 25, 2014 (JP) .............................. JP2014-262104

(51) Int. Cl.
*C21D 9/50* (2006.01)
*B21C 37/08* (2006.01)
(Continued)

(52) U.S. Cl.
CPC ................ *C21D 9/50* (2013.01); *B21B 19/14* (2013.01); *B21B 23/00* (2013.01); *B21C 37/08* (2013.01);
(Continued)

(58) Field of Classification Search
CPC . C21D 9/08; B21C 37/08; B21B 19/10; F16L 9/17
See application file for complete search history.

(56) References Cited

U.S. PATENT DOCUMENTS 7,879,287 B2 2/2011 Kobayashi et al.
2002/0100524 A1* 8/2002 Tverberg ............... C21D 8/105
148/519
(Continued)

FOREIGN PATENT DOCUMENTS

CA 2 281 300 A1 3/2001
CN 102367560 A 3/2012
(Continued)

OTHER PUBLICATIONS

Apr. 17, 2018 Extended European Search Report issued in European Patent Application No. 15872198.5.
(Continued)

*Primary Examiner* — Nicholas A Wang
(74) *Attorney, Agent, or Firm* — Oliff PLC (57) ABSTRACT A high-strength high-toughness electric-resistance-welded steel pipe having high resistance to post-weld heat treatment is provided. The steel pipe having a composition including C: 0.01% to 0.12%, Si: 0.05% to 0.50%, Mn: 1.0% to 2.2%, P: 0.03% or less, S: 0.005% or less, Al: 0.001% to 0.10%,
(Continued)

N: 0.006% or less, Nb: 0.010% to 0.100%, and Ti: 0.001% to 0.050%. The steel pipe having a structure composed of a 90% or more by volume of a bainitic ferrite phase as a main phase and 10% or less (including 0%) by volume of a second phase. The bainitic ferrite phase having an average grain size of 10 μm or less, and the structure containing fine Nb precipitates having a particle size of less than 20 nm dispersed in a base material portion. The steel pipe having high strength, toughness, and high resistance that is maintained through post-weld heat treatment.

10 Claims, 2 Drawing Sheets (51) Int. Cl.
| | |
|---|---|
| C21D 9/08 | (2006.01) |
| C22C 38/14 | (2006.01) |
| C21D 8/02 | (2006.01) |
| C22C 38/12 | (2006.01) |
| B21B 19/14 | (2006.01) |
| C22C 38/00 | (2006.01) |
| C22C 38/04 | (2006.01) |
| B21B 23/00 | (2006.01) |
| B23K 11/087 | (2006.01) |
| C21D 6/00 | (2006.01) |
| C21D 9/46 | (2006.01) |
| C22C 38/02 | (2006.01) |
| C22C 38/06 | (2006.01) |
| C22C 38/08 | (2006.01) |
| C22C 38/16 | (2006.01) |
| C22C 38/22 | (2006.01) |
| C22C 38/24 | (2006.01) |
| C22C 38/26 | (2006.01) |
| C22C 38/28 | (2006.01) |
| C22C 38/32 | (2006.01) |
| C22C 38/38 | (2006.01) |
| F16L 9/17 | (2006.01) |
| B23K 101/06 | (2006.01) |
| B23K 103/04 | (2006.01) |

(52) U.S. Cl.
CPC .......... *B23K 11/0873* (2013.01); *C21D 6/001* (2013.01); *C21D 6/002* (2013.01); *C21D 6/005* (2013.01); *C21D 6/008* (2013.01); *C21D 8/02* (2013.01); *C21D 8/0205* (2013.01); *C21D 8/0263* (2013.01); *C21D 9/08* (2013.01); *C21D 9/46* (2013.01); *C22C 38/001* (2013.01); *C22C 38/002* (2013.01); *C22C 38/004* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *F16L 9/17* (2013.01); *B23K 2101/06* (2018.08); *B23K 2103/04* (2018.08); *C21D 2211/002* (2013.01)

(56) References Cited

U.S. PATENT DOCUMENTS

| | | | |
|---|---|---|---|
| 2003/0180174 A1* | 9/2003 | Ishikawa | C22C 38/04 420/124 |
| 2004/0187982 A1* | 9/2004 | Nakata | B23K 35/3053 148/653 |
| 2009/0032150 A1* | 2/2009 | Ohe | C21D 8/105 148/593 |
| 2010/0032048 A1* | 2/2010 | Yokoyama | C22C 38/02 138/171 |
| 2013/0092280 A1 | 4/2013 | Sawamura et al. | |
| 2014/0190597 A1* | 7/2014 | Hara | C22C 38/32 148/602 |
| 2014/0290807 A1 | 10/2014 | Goto et al. | |

FOREIGN PATENT DOCUMENTS

| | | |
|---|---|---|
| CN | 103911558 A | 7/2014 |
| CN | 107109567 A | 8/2017 |
| EP | 1 462 535 A1 | 9/2004 |
| EP | 2878696 A1 | 6/2015 |
| EP | 3239317 A1 | 11/2017 |
| JP | H10265847 A | 10/1998 |
| JP | 3376850 B2 | 2/2003 |
| JP | 2007098397 A | 4/2007 |
| JP | 2014062309 A | 4/2014 |
| KR | 2013-0048796 A | 5/2013 |
| SU | 1388236 * | 10/1986 |

OTHER PUBLICATIONS

Apr. 2, 2018 Office Action issued in Chinese Patent Application No. 201580070398.9.
May 7, 2019 Office Action issued in Canadian Application No. 2,967,902.
Aug. 13, 2018 Office Action issued in Canadian Application No. 2,967,902.
Aug. 9, 2018 Office Action issued in Korean Application No. 10-2017-7015946.
Oct. 8, 2019 Office Action issued in U.S. Appl. No. 15/539,421.
Mar. 24, 2020 Office Action issued in U.S. Appl. No. 15/539,421.

* cited by examiner

HIGH STRENGTH THICK-WALLED ELECTRIC-RESISTANCE-WELDED STEEL PIPE FOR DEEP-WELL CONDUCTOR CASING, METHOD FOR MANUFACTURING THE SAME, AND HIGH-STRENGTH THICK-WALLED CONDUCTOR CASING FOR DEEP WELLS

TECHNICAL FIELD

The present disclosure relates to an electric-resistance-welded steel pipe suitable for a conductor casing used as a retaining wall in oil or gas well drilling and more particularly to a high-strength thick-walled electric-resistance-welded steel pipe which is suitable for a conductor casing and is used for wells in deep-water oil or gas field development at a depth of 3,000 m or more (hereinafter also referred to as deep wells) and to a method for manufacturing the high-strength thick-walled electric-resistance-welded steel pipe.

BACKGROUND ART

Conductor casings are used as retaining walls in wells at an early stage of oil or gas well drilling and protect oil well pipes from external pressure. Conductor casings are conventionally manufactured by joining a UOE steel pipe to a connector (threaded forged member).

When placed into wells, conductor casings are repeatedly subjected to bending deformation. When placed into deep wells, conductor casings are also subjected to stress loading due to their own weights. Thus, deep-well conductor casings are particularly required (1) not to be broken by repeated bending deformation during placement, and (2) to have strength to bear their own weights.

In order to prevent conductor casings from being broken by bending deformation, it is believed to be important to reduce stress concentration, for example, caused by linear misalignment in a joint. Linear misalignment may be reduced by improving the circularity of a steel pipe to be used.

In general, conductor casings are subjected to post-weld heat treatment at a temperature of more than 500° C. and less than 600° C. in order to relieve the residual stress of a joint between a steel pipe and a forged member or to prevent hydrogen cracking. Thus, there is a demand for a steel pipe that suffers a smaller decrease in strength due to post-weld heat treatment, can maintain desired strength even after post-weld heat treatment, and has high resistance to post-weld heat treatment.

For example, Patent Literature 1 describes a high-strength riser steel pipe having good high-temperature SR characteristics (resistance to SR embrittlement) to meet the demand. In the technique described in Patent Literature 1, a riser steel pipe having good high-temperature SR characteristics has a steel composition containing C: 0.02% to 0.18%, Si: 0.05% to 0.50%, Mn: 1.00% to 2.00%, Cr: 0.30% to 1.00%, Ti: 0.005% to 0.030%, Nb: 0.060% or less, and Al: 0.10% or less by weight. In the technique described in Patent Literature 1, in addition to these components, a riser steel pipe may further contain one or two or more of Cu: 0.50% or less, Ni: 0.50% or less, Mo: 0.50% or less, and V: 0.10% or less, and further Ca: 0.0005% to 0.0050% and/or B: 0.0020% or less. In the technique described in Patent Literature 1, inclusion of a predetermined amount of Cr retards softening of the base material ferrite and increases resistance to softening, which can suppress the decrease toughness and strength caused by post-weld heat treatment and improve high-temperature SR characteristics.

Patent Literature 2 describes, as a technique for improving the circularity of a steel pipe, a method for expanding a UOE steel pipe by using a pipe expander in which each dice of all mounted on the pipe expander has grooved outer surface, and changing the dies mounted on the pipe expander for each steel pipe to be expanded, each of the dies facing a piece of excess weld metal inside a steel pipe weld portion. Patent Literature 2 states that the technique can uniformize the wear loss of the dies mounted on the pipe expander and improve the circularity of a steel pipe.

CITATION LIST

Patent Literature

PTL 1: Japanese Patent No. 3558198
PTL 2: Japanese Unexamined Patent Application Publication No. 2006-289439

SUMMARY

Technical Problem

In order to prevent a conductor casing from being broken by repeated bending deformation during placement, it is important to reduce stress concentration. Thus, a steel pipe to which a connector is to be joined should have a certain degree of circularity. However, Patent Literature 1 does not describe a measure to improve circularity, for example, by reducing linear misalignment. The technique described in Patent Literature 1 includes no measure to improve circularity, and a steel pipe will have insufficient circularity at its end portion, particularly when used as a deep-well conductor casing. When a steel pipe manufactured by the technique described in Patent Literature 1 is used as a deep-well conductor casing, an additional step is necessary to improve the circularity of an end portion of the steel pipe by cutting or straightening. Thus, there is a problem in the technique described in Patent Literature 1 that the productivity of manufacturing conductor casings is decreased.

The technique described in Patent Literature 2 also cannot ensure sufficient circularity particularly for deep-well conductor casings, which is a problem.

The present disclosure solves such problems of the related art and aims to provide a high-strength high-toughness thick-walled electric-resistance-welded steel pipe having high resistance to post-weld heat treatment suitable for a deep-well conductor casing and a method for manufacturing the steel pipe.

The term "high strength", as used herein, refers to high strength of at least the API X80 grade, that is, a yield strength YS of 555 MPa or more and a tensile strength TS of 625 MPa or more. The term "high toughness", as used herein, means that the absorbed energy $vE_{-40}$ in a Charpy impact test at a test temperature of −40° C. is 27 J or more. The term "thick-walled", as used herein, refers to a thickness of 15 mm or more. For placement in deep water, the thickness is preferably 20 mm or more. The phrase "high resistance to post-weld heat treatment", as used herein, means that the base material maintains the strength of at least the API X80 grade even after post-weld heat treatment performed at more than 500° C. and less than 600° C.

Solution to Problem

In order to achieve the objects, the present inventors have intensively studied the characteristics of a steel pipe suitable for a deep-well conductor casing. As a result, the present inventors have found that in order to prevent a conductor casing from being broken by bending deformation during placement, it is necessary to use a steel pipe having a circularity of 0.6% or less. The present inventors have found that if a steel pipe to be used has a circularity of 0.6% or less, linear misalignment between a threaded member and a joint (an end portion of the steel pipe) can be reduced to prevent the steel pipe from being broken by repeated bending deformation, without a particular additional process, such as cutting or straightening.

The present inventors have considered that such a steel pipe is preferably an electric-resistance-welded steel pipe rather than a UOE steel pipe. Electric-resistance-welded steel pipes have a cylindrical shape formed by continuous forming with a plurality of rolls and have higher circularity than UOE steel pipes formed by press forming and pipe expanding. The present inventors have found from their study that forming by reducing rolling with sizer rolls finally performed after electric resistance welding is effective in order to manufacture an electric-resistance-welded steel pipe having circularity suitable for a deep-well conductor casing. The present inventors have also found that in roll forming in pipe manufacturing, in addition to roll forming with a cage roll group and a fin pass forming roll group, pressing two or more portions of an inner wall of a hot-rolled steel plate being subjected to the forming process with an inner roll disposed downstream of the cage roll group is effective in further improving circularity, and further this can reduce the load of fin pass forming.

The present inventors have also intensively studied the effects of the composition of a hot-rolled steel plate used as a steel pipe material and the hot-rolling conditions on the steel pipe strength after post-weld heat treatment. As a result, the present inventors have found that in order that an electric-resistance-welded steel pipe maintains the strength of at least the API X80 grade even after post-weld heat treatment performed at more than 500° C. and less than 600° C., a hot-rolled steel plate used as a steel pipe material should contain fine Nb precipitates (precipitated Nb) having a particle size less than 20 nm in an amount of more than 75% of the Nb content on a Nb equivalent basis. The present inventors have found that when the amount of fine Nb precipitates (precipitated Nb) is 75% or less of the Nb content, the decrease in yield strength YS due to post-weld heat treatment cannot be suppressed.

Embodiments of the present disclosure are described below.

(1) A high-strength thick-walled electric-resistance-welded steel pipe for a deep-well conductor casing, the steel pipe having a composition containing, on a mass percent basis: C: 0.01% to 0.12%, Si: 0.05% to 0.50%, Mn: 1.0% to 2.2%, P: 0.03% or less, S: 0.005% or less, Al: 0.001% to 0.10%, N: 0.006% or less, Nb: 0.010% to 0.100%, and Ti: 0.001% to 0.050%, the remainder being Fe and incidental impurities, the steel pipe having a structure composed of 90% or more by volume of a bainitic ferrite phase as a main phase and 10% or less (including 0%) by volume of a second phase, the bainitic ferrite phase having an average grain size of 10 μm or less, the structure containing fine Nb precipitates having a particle size of less than 20 nm dispersed in a base material portion, a ratio (%) of the fine Nb precipitates to the total amount of Nb being more than 75% on a Nb equivalent basis, and the circularity of an end portion of the steel pipe defined by the following formula (1) being 0.6% or less.

$$\text{Circularity (\%)} = \{(\text{maximum outer diameter mm}\phi \text{ of steel pipe}) - (\text{minimum outer diameter mm}\phi \text{ of steel pipe})\}/(\text{nominal outer diameter mm}\phi) \times 100 \quad (1)$$

(2) The high-strength thick-walled electric-resistance-welded steel pipe for a deep-well conductor casing according to (1), wherein the composition further contains one or two or more selected from V: 0.1% or less, Mo: 0.5% or less, Cr: 0.5% or less, Cu: 0.5% or less, Ni: 1.0% or less, and B: 0.0030% or less on a mass percent basis.

(3) The high-strength thick-walled electric-resistance-welded steel pipe for a deep-well conductor casing according to (1) or (2), wherein the composit further contains one or two selected from Ca: 0.0005% to 0.0050% and REM: 0.0005% to 0.0050% on a mass percent basis.

(4) A method for manufacturing a high-strength thick-walled electric-resistance-welded steel pipe for a deep-well conductor casing, including: continuously rolling a hot-rolled steel plate with a roll forming machine to form an open pipe having a generally circular cross section; butting edges of the open pipe; electric-resistance-welding a portion where the edges being butted while pressing the butted edges to contact each other by squeeze rolls to form an electric-resistance-welded steel pipe; subjecting the electric-resistance-welded portion of the electric-resistance-welded steel pipe to in-line heat treatment; and reducing the diameter of the electric-resistance-welded steel pipe by rolling, wherein the hot-rolled steel plate is manufactured by heating to soak a steel at a heating temperature in the range of 1150° C. to 1250° C. for 60 minutes or more, the steel having a composition containing, on a mass percent basis, C: 0.01% to 0.12%, Si: 0.05% to 0.50%, Mn: 1.0% to 2.2%, P: 0.03% or less, S: 0.005% or less, Al: 0.001% to 0.10%, N: 0.006% or less, Nb: 0.010% to 0.100%, and Ti: 0.001% to 0.050%, the remainder being Fe and incidental impurities, hot-rolling the steel with a finishing delivery temperature of 750° C. or more, after completion of the hot rolling, subjecting the hot-rolled steel plate to accerelated cooling such that the average cooling rate in a temperature range of 750° C. to 650° C. at the center of plate thickness ranges from 8° C./s to 70° C./s, and coiling the hot-rolled steel plate at a coiling temperature of more than 580° C. and 700° C. or less.

(5) The method for manufacturing a high-strength thick-walled electric-resistance-welded steel pipe for a deep-well conductor easing according to (4), wherein the roll forming machine includes a cage roll group composed of a plurality of rolls and a fin pass forming roll group composed of a plurality of rolls.

(6) The method for manufacturing a high-strength thick-walled electric-resistance-welded steel pipe for a deep-well conductor casing according to (5), wherein two or more portions of an inner wall of the hot-rolled steel plate are pressed with an inner roll disposed downstream of the cage roll group during a forming process.

(7) The method for manufacturing a high-strength thick-walled electric-resistance-welded steel pipe for a deep-well conductor casing according to any one of (4) to (6), wherein the in-line heat treatment of the electric-resistance-welded portion includes heating the electric-resistance-welded portion to a heating temperature in the range of 830° C. to 1150° C. and cooling the electric-resistance-welded portion to a cooling stop temperature of 550° C. or less at the center of plate thickness such that the average cooling rate in a temperature range of 800° C. to 550° C. at the center of plate thickness ranges from 10° C./s to 70° C./s.

(8) The method for manufacturing a high-strength thick-walled electric-resistance-welded steel pipe for a deep-well conductor casing according to any one of (4) to (7), wherein a reduction ratio in the reducing rolling is in the range of 0.2% to 3.3%.

(9) The method for manufacturing a high-strength thick-walled electric-resistance-welded steel pipe for a deep-well conductor casing according to any one of (4) to (8), wherein the composition further contains one or two or more selected from V: 0.1% or less, Mo: 0.5% or less, Cr: 0.5% or less, Cu: 0.5% or less, Ni: 1.0% or less, and B: 0.0030% or less on a mass percent basis.

(10) The method for manufacturing a high-strength thick-walled electric-resistance-welded steel pipe for a deep-well conductor casing according to any one of (4) to (9), wherein the composition further contains one or two selected from Ca: 0.0005% to 0.0050% and REM: 0.0005% to 0.0050% on a mass percent basis.

(11) A high-strength thick-walled conductor casing for deep wells, comprising a screw member disposed on each end of the high-strength thick-walled electric-resistance-welded steel pipe for a deep-well conductor casing according to any one of (1) to (3).

Advantageous Effects

The present disclosure has industrially great advantageous effects in that a high-strength thick-walled electric-resistance-welded steel pipe that is suitable for a deep-well conductor casing, has high strength and toughness, and has high resistance to post-weld heat treatment can be easily manufactured at low cost without particular additional treatment. The present disclosure can also reduce the occurrence of breakage of a conductor casing during placement and contributes to reduced placement costs. The present disclosure can also provide a conductor casing that can maintain the strength of at least the API X80 grade even after post-weld heat treatment performed at more than 500° C. and less than 600° C. An electric-resistance-welded steel pipe according to the present disclosure also has an effect that it is useful as a line pipe manufactured by joining pipes together by girth welding.

DESCRIPTION OF EMBODIMENTS

A high-strength thick-walled electric-resistance-welded steel pipe according to the present disclosure is a high-strength thick-walled electric-resistance-welded steel pipe for a deep-well conductor casing. The term "high-strength thick-walled electric-resistance-welded steel pipe", as used herein, refers to a thick-walled electric-resistance-welded steel pipe having a thickness of 15 mm or more in which both a base material portion and an electric-resistance-welded portion have high strength of at least the API X80 grade. The base material portion has a yield strength YS of 555 MPa or more and a tensile strength TS of 625 MPa or more, and the electric-resistance-welded portion has a tensile strength TS of 625 MPa or more.

A high-strength thick-walled electric-resistance-welded steel pipe according to the present disclosure has a composition containing, on a mass percent basis, C: 0.01% to 0.12%, Si: 0.05% to 0.50%, Mn: 1.0% to 2.2%, P: 0.03% or less, S: 0.005% or less, Al: 0.001% to 0.10%, N: 0.006% or less, Nb: 0.010% to 0.100%, and Ti: 0.001% to 0.050%, optionally further containing one or two or more selected from V: 0.1% or less, Mo: 0.5% or less, Cr: 0.5% or less, Cu: 0.5% or less, Ni: 1.0% or less, and B: 0.0030% or less, and/or one or two selected from Ca: 0.0005% to 0.0050% and REM: 0.0005% to 0.0050%, the remainder being Fe and incidental impurities.

First, the reasons for limiting the composition of a high-strength thick-walled electric-resistance-welded steel pipe according to the present disclosure will be described below. Unless otherwise specified, the mass percentage of a component is simply expressed in %.

C: 0.01% to 0.12%

C is an important element that contributes to increased strength of a steel pipe. A C content of 0.01% or more is required to achieve desired high strength. However, a high C content of more than 0.12% results in poor weldability. Furthermore, during cooling after hot rolling or during in-line heat treatment of an electric-resistance-welded portion, a high C content of more than 0.12% makes the formation of martensite easier in the case of rapid cooling or the formation of a large amount of pearlite easier in the case of slow cooling, thereby possibly reducing toughness or strength. Thus, the C content is limited to the range of 0.01% to 0.12%. The C content preferably ranges from 0.03% to 0.10%, more preferably 0.03% to 0.08%.

Si: 0.05% to 0.50%

Si is an element that contributes to increased strength of a steel pipe by solid-solution strengthening. A Si content of 0.05% or more is required to achieve desired high strength by such an effect. Si has a higher affinity for O (oxygen) than Fe and, together with Mn oxide, forms a viscous eutectic oxide during electric resistance welding. Thus, an excessive Si content of more than 0.50% results in poor quality of an electric-resistance-welded portion. Thus, the Si content is limited to the range of 0.05% to 0.50%. The Si content preferably ranges from 0.05% to 0.30%.

Mn: 1.0% to 2.2%

Mn is an element that contributes to increased strength of a steel pipe. A Mn content of 1.0% or more is required to achieve desired high strength. However, in the same manner as in C, a high Mn content of more than 2.2% makes the formation of martensite easier and results in poor weldability. Thus, the Mn content is limited to the range of 1.0% to 2.2%. The Mn content preferably ranges from 1.2% to 2.0%.

P: 0.03% or less

P exists as an impurity in steel, tends to segregate at grain boundaries, and adversely affects the steel pipe characteristics, such as toughness. Thus, the P content is preferably minimized. In the present disclosure, the allowable P content is up to 0.03%. Thus, the P content is limited to 0.03% or less. The P content is preferably 0.02% or less. However, an excessive reduction in P content increases refining costs. Thus, the P content is preferably 0.001% or more.

S: 0.005% or less

S exists in the form of coarse sulfide inclusions, such as MnS, in steel and reduces ductility and toughness. Thus, the S content is desirably minimized. In the present disclosure, the allowable S content is up to 0.005%. Thus, the S content is limited to 0.005% or less. The S content is preferably 0.004% or less. However, an excessive reduction in S content increases refining costs. Thus, the S content is preferably 0.0001% or more.

Al: 0.001% to 0.10%

Al is an element that acts usefully as a deoxidizing agent for steel. Such an effect requires an Al content of 0.001% or more. However, a high Al content of more than 0.10% results in the formation of an Al oxide and low cleanliness of steel. Thus, the Al content is limited to the range of 0.001% to 0.10%. The Al content preferably ranges from 0.005% to 0.08%.

N: 0.006% or less

N exists as an incidental impurity in steel and forms a solid solution or nitride, thereby reducing toughness of a base material portion or an electric-resistance-welded portion of a steel pipe. Thus, the N content is desirably minimized. In the present disclosure, the allowable N content is up to 0.006%. Thus, the N content is limited to 0.006% or less.

Nb: 0.010% to 0.100%

Nb is an important element in the present disclosure. While steel (a slab) is heated, Nb is present as Nb carbonitride in the steel, suppresses coarsening of austenite grains, and contributes to a finer structure. Nb forms fine Nb precipitates in a hot-rolled steel plate, suppresses recovery and recrystallization of a matrix during post-weld heat treatment performed at more than 500° C. and less than 600° C., and prevents the decrease in the strength of a base material portion of a steel pipe after the post-weld heat treatment. Such an effect requires a Nb content of 0.010% or more. However, an excessive Nb content of more than 0.100% adversely affects the toughness of a steel pipe. Thus, the Nb content is limited to the range of 0.010% to 0.100%. The Nb content preferably ranges from 0.020% to 0.080%.

Ti: 0.001% to 0.050%

Ti forms a Ti nitride combining with N and fixes N that adversely affects the toughness of a steel pipe, and thereby has the action of improving the toughness of the steel pipe. Such an effect requires a Ti content of 0.001% or more. However, a Ti content of more than 0.050% results in a significant decrease in the toughness of a steel pipe. Thus, the Ti content is limited to the range of 0.001% to 0.050%. The Ti content preferably ranges from 0.005% to 0.030%.

These components are base components. In addition to the base components, a steel pipe according to the present disclosure may contain one or two or more selected from V: 0.1% or less, Mo: 0.5% or less, Cr: 0.5% or less, Cu: 0.5% or less, Ni: 1.0% or less, and B: 0.0030% or less, and/or one or two selected from Ca: 0.0005% to 0.0050% and REM: 0.0005% to 0.0050%.

One or two or more selected from V: 0.1% or less, Mo: 0.5% or less, Cr: 0.5% or less, Cu: 0.5% or less, Ni: 1.0% or less, and B: 0.0030% or less V, Mo, Cr, Cu, Ni, and B are elements that improve hardenability and contribute to increased strength of a steel plate, and can be appropriately selected for use. These elements reduce the formation of pearlite and polygonal ferrite particularly in thick plates having a thickness of 16 mm or more and are effective in achieving desired strength and toughness. It is desirable to contain V: 0.05% or more, Mo: 0.05% or more, Cr: 0.05% or more, Cu: 0.05% or more, Ni: 0.05% or more, and B: 0.0005% or more to produce such an effect. However, the content exceeding V: 0.1%, Mo: 0.5%, Cr: 0.5%, Cu: 0.5%, Ni: 1.0%, or B: 0.0030% may result in reduced weldability and toughness and increased material costs. Thus, the amounts of these elements are preferably limited to V: 0.1% or less, Mo: 0.5% or less, Cr: 0.5% or less, Cu: 0.5% or less, Ni: 1.0% or less, and B: 0.0030% or less, if any. V: 0.08% or less, Mo: 0.45% or less, Cr: 0.3% or less, Cu: 0.35% or less, Ni: 0.35% or less, and B: 0.0025% or less are more preferred.

One or two selected from Ca: 0.0005% to 0.0050% and REM: 0.0005% to 0.0050%

Ca and REM are elements that contribute to morphology control of inclusions in which elongated sulfide inclusions, such as MnS, are transformed into spherical sulfide inclusions, and can be appropriately selected for use. To produce such an effect, a Ca content of 0.0005% or more or a REM content of 0.0005% or more is required. However, more than 0.0050% Ca or REM may result in increased oxide inclusions and reduced toughness. Thus, if present, Ca and REM are preferably limited to Ca: 0.0005% to 0.0050% and REM: 0.0005% to 0.0050%, respectively.

The remainder other than the components described above is made up of Fe and incidental impurities.

A high-strength thick-walled electric-resistance-welded steel pipe according to the present disclosure has the composition described above, and further, each of a base material portion and an electric-resistance-welded portion of the high-strength thick-walled electric-resistance-welded steel pipe is composed of 90% or more by volume of bainitic ferrite phase as a main phase and 10% or less (including 0%) by volume of a second phase. The steel pipe according to the present disclosure is a thick-walled electric-resistance-welded steel pipe, the average grain size of the bainitic ferrite phase described above being 10 μm or less, the structure being composed of fine Nb precipitates having a particle size of less than 20 nm dispersed in the base material portion, the ratio (%) of the fine Nb precipitates to the total amount of Nb being more than 75% on a Nb equivalent basis, the circularity of an end portion of the steel pipe being 0.6% or less.

Main phase: 90% or more by volume of a bainitic ferrite phase

In order to achieve desired high strength and high toughness for a conductor casing, both a base material portion and an electric-resistance-welded portion of an electric-resistance-welded steel pipe according to the present disclosure have a structure composed mainly of 90% or more by volume of a bainitic ferrite phase. Less than 90% of a bainitic ferrite phase or 10% or more of a second phase other than the main phase results in an inability to achieve desired toughness. The second phase other than the main phase may be a hard phase, such as pearlite, degenerate pearlite, bainite, or martensite. Thus, the volume percentage of the bainitic ferrite phase serving as the main phase is limited to 90% or more. The volume percentage of the bainitic ferrite phase is preferably 95% or more.

Average grain size of bainitic ferrite phase: 10 μm or less

In order to achieve desired high strength and high toughness for a conductor casing, in the present disclosure, a bainitic ferrite phase serving as the main phase has a fine structure having an average grain size of 10 μm or less. An average grain size of more than 10 μm results in an inability to achieve desired high toughness. Thus, the average grain size of the bainitic ferrite phase serving as the main phase is limited to 10 μm or less. The term "grain size", as used herein, refers to the size of a region in which the orientation difference between adjacent crystal grains measured by a SEM/EBSD method is 15 degrees or less.

Fine Nb precipitates having a particle size of less than 20 nm: the ratio (%) of the Nb precipitates to the total amount of Nb is more than 75% on a Nb equivalent basis.

Fine Nb precipitates (mainly carbonitride) having a particle size of less than 20 nm have an action to suppress the decrease in yield strength due to recovery and recrystallization in post-weld heat treatment performed in the temperature range of more than 500° C. and less than 600° C. or an action to provide high resistance to post-weld heat treatment. Thus, in the present disclosure, fine Nb precipitates having a particle size of less than 20 nm is precipitated in a base material portion of a steel pipe by an amount that the ratio (%) of fine Nb precipitates having a particle size of less than 20 nm to the total amount of Nb is more than 75% on a Nb equivalent basis. When the ratio (%) of the fine Nb precipitates is 75% or less on a Nb equivalent basis, the precipitation of the fine Nb precipitates is insufficient and results in an inability to achieve desired resistance to post-weld heat treatment. Thus, the ratio (%) of the amount of fine Nb precipitates having a particle size of less than 20 nm to the total amount of Nb is limited to more than 75% on a Nb equivalent basis.

The phrase "the amount of fine Nb precipitates having a particle size of less than 20 nm", as used herein, refers to a value determined by electrolyzing an electroextraction test piece taken from a base material portion of an electric-resistance-welded steel pipe in an electrolyte solution (10% by volume acetylacetone-1% by mass tetramethylammonium chloride-methanol solution), filtering the resulting electrolytic residue through a filter having a pore size of 0.02 μm, and analyzing the amount of Nb passing through the filter.

A high-strength thick-walled electric-resistance-welded steel pipe according to the disclosed exemplary embodiments has the composition and structure described above, and the circularity of an end portion of the steel pipe is 0.6% or less.

Circularity: 0.6% or less

If the circularity of an end portion of an electric-resistance-welded steel pipe is 0.6% or less, without cutting and/or straightening before the end portion of the pipe is joined to a connector by girth welding, linear misalignment in the joint is allowable, and the occurrence of breakage by repeated bending deformation can be reduced. If the circularity of an electric-resistance-welded steel pipe is more than 0.6%, the linear misalignment of a joint between the steel pipe and a connector (screw member) increases, and the joint is likely to be broken by the weight of the pipe and bending deformation during placement. Thus, the circularity of an electric-resistance-welded steel pipe is limited to 0.6% or less. The circularity of a steel pipe is defined by the following formula (1).

$$\text{Circularity (\%)} = \{(\text{maximum outer diameter mm}\phi \text{ of steel pipe}) - (\text{minimum outer diameter mm}\phi \text{ of steel pipe})\}/(\text{nominal outer diameter mm}\phi) \times 100 \quad (1)$$

It is desirable to continuously measure the maximum outer diameter and minimum outer diameter of a steel pipe with a laser displacement meter. In the case of manual measurement from necessity, the maximum outer diameter and minimum outer diameter of a steel pipe should be determined from measurements of at least 32 points on the circumference of the steel pipe.

In a deep-well conductor casing including a high-strength thick-walled electric-resistance-welded steel pipe according to the present disclosure, the high-strength thick-walled electric-resistance-welded steel pipe is provided with a screw member at each end thereof. The screw member may be attached by any method, for example, by MIG welding or TIG welding. The screw member may be made of, for example, carbon steel or stainless steel.

A method for manufacturing a high-strength thick-walled electric-resistance-welded steel pipe according to the present disclosure will be described below.

An electric-resistance-welded steel pipe according to the present disclosure is manufactured using a hot-rolled steel plate as a material.

More specifically, an electric-resistance-welded steel pipe according to the present disclosure is manufactured by continuously cold-rolling a hot-rolled steel plate with a roll forming machine (preferably with a cage roll group composed of a plurality of rolls and a fin pass forming roll group composed of a plurality of rolls) to form an open pipe having a generally circular cross section, butting against edges of the open pipe each other, electric-resistance-welding a portion where the edges being butted while pressing the butted edges to contact each other by squeeze rolls to form an electric-resistance-welded steel pipe, subjecting the electric-resistance-welded portion of the electric-resistance-welded steel pipe to in-line heat treatment, and reducing the diameter of the electric-resistance-welded steel pipe by rolling.

The hot-rolled steel plate used as a material is a thick hot-rolled steel plate (hot-rolled steel strip) having a thickness of 15 mm or more and preferably 51 mm or less manufactured by subjecting a steel having the composition described above to the following process.

The steel may be manufactured by any method. Preferably, a molten steel having the composition described above is produced by a conventional melting method, such as with a converter, and is formed into a cast block (steel), such as a slab, by a conventional casting process, such as a continuous casting process. Instead of the continuous casting process, a steel (steel block) may be manufactured by an ingot casting and slabbing process without problems.

A steel having the above composition is heated to a temperature in the range of 1150° C. to 1250° C. and is subjected to hot-rolling, which includes rough rolling and finish rolling, at a finishing delivery temperature of 750° C. or more.

Heating temperature: 1150° C. to 1250° C.

A low heating temperature at which finer crystal grains are expected to grow is preferred in order to improve the toughness of a hot-rolled steel plate. However, a heating temperature of less than 1150° C. is too low to promote solid solution of undissolved carbide, failing to achieve the desired high strength of at least the API X80 grade in some cases. On the other hand, a high heating temperature of more than 1250° C. may cause coarsening of austenite (γ) grains, reduced toughness, more scales and poor surface quality, and result in economic disadvantages due to increased energy loss. Thus, the heating temperature of steel ranges from 1150° C. to 1250° C. The soaking time at the heating temperature is preferably 60 minutes or more, in order to make the temperature of steel which is heated uniform.

The rough rolling is not particularly limited, provided that the resulting sheet bar has a predetermined size and shape. The finishing delivery temperature of the finish rolling is adjusted to be 750° C. or more. Here, the temperature is expressed in terms of a surface temperature.

Finishing delivery temperature: 750° C. or more

A finishing delivery temperature of less than 750° C. causes induction of ferrite transformation, and processing of the resulting coarse ferrite results in reduced strength. Thus, the finishing delivery temperature is limited to 750° C. or more. The rolling reduction in a non-recrystallization temperature range in which a temperature at the center of plate thickness is 930° C. or less is preferablly adjusted to be 20% or more. A rolling reduction of less than 20% in the non-recrystallization temperature range is an insufficient rolling reduction for the non-recrystallization temperature range and may therefore result in a small number of ferrite nucleation sites, thus failing to decrease the size of ferrite grains. Thus, the rolling reduction in the non-recrystallization temperature range is preferably adjusted to be 20% or more. From the viewpoint of the load to a rolling mill, the rolling reduction in the non-recrystallization temperature range is preferably 95% or less.

In the present disclosure, after the completion of the hot rolling, cooling is immediately started preferably within 5 s. The hot-rolled plate is subjected to accerelated cooling such that the average cooling rate in a temperature range of 750° C. to 650° C. at the center of plate thickness ranges from 8° C./s to 70° C./s, and is coiled at a coiling temperature of more than 580° C. and 700° C. or less. The coiled plate is left to cool.

Average cooling rate of accelerated cooling in the temperature range of 750° C. to 650° C.: 8° C./s to 70° C./s An average cooling rate of less than 8° C./s in the temperature range of 750° C. to 650° C. is slow and results in a structure containing a coarse polygonal ferrite phase having an average grain size of more than 10 μm and pearlite, thus failing to achieve the toughness and strength required for casing. On the other hand, an average cooling rate of more than 70° C./s may result in the formation of a martensite phase and reduced toughness. Thus, the average cooling rate in the temperature range of 750° C. to 650° C. is limited to the range of 8° C./s to 70° C./s. The average cooling rate preferably ranges from 10° C./s to 50° C./s. These temperatures are the temperatures at the center of plate thickness. The temperatures at the center of plate thickness are determined by calculating the temperature distribution in a cross section by heat transfer analysis and correcting the calculated data in accordance with the actual outer and inner surface temperatures.

The cooling stop temperature of the accelerated cooling preferably ranges from 580° C. to 720° C. in terms of the plate surface temperature. When the cooling stop temperature of the accelerated cooling is outside the temperature range of 580° C. to 720° C., the desired coiling temperature of more than 580° C. and 700° C. or less may be impossible to consistently achieve.

Coiling temperature: more than 580° C. and 700° C. or less

A high coiling temperature of more than 700° C. causes increased amount of precipitation of coarse Nb carbonitride (precipitates) and results in reduced yield strength after post-weld heat treatment performed at more than 500° C. and less than 600° C. On the other hand, a coiling temperature of 580° C. or less causes decreased amount of precipitation of fine Nb carbonitride (precipitates) and results in reduced yield strength after post-weld heat treatment performed at more than 500° C. and less than 600° C. Thus, the coiling temperature is limited to a temperature in the temperature range of more than 580° C. and 700° C. or less. When the coiling temperature is adjusted to be in this temperature range, the structure can contain fine Nb precipitates having a particle size of less than 20 nm dispersed in a base material portion, with the ratio (%) of the fine Nb precipitates to the total amount of Nb being mote than 75% on a Nb equivalent basis. This can suppress the decrease in yield strength due to post-weld heat treatment performed at more than 500° C. and less than 600° C. The coiling temperature preferably ranges from 600° C. to 680° C. These temperatures are expressed in terms of a plate surface temperature.

A hot-rolled steel plate manufactured under the conditions described above contains 90% or more by volume of a bainitic ferrite phase as a main phase, and the remainder is 10% or less (including 0%) by volume of a second phase other than the bainitic ferrite phase. The main phase has an average grain size of 10 μm or less, and the hot-rolled steel plate has a structure containing fine dispersing Nb precipitates having a particle size of less than 20 nm dispersed in a base material portion, the ratio (%) of the fine Nb precipitates to the total amount of Nb being more than 75% on a Nb equivalent basis. The hot-rolled steel plate has high strength of at least the API X80 grade, that is, a high yield strength YS of 555 MPa or more, and low-temperature toughness represented by an absorbed energy $vE_{-40}$ of 27 J or more in a Charpy impact test at a test temperature of −40° C.

Figure 1:
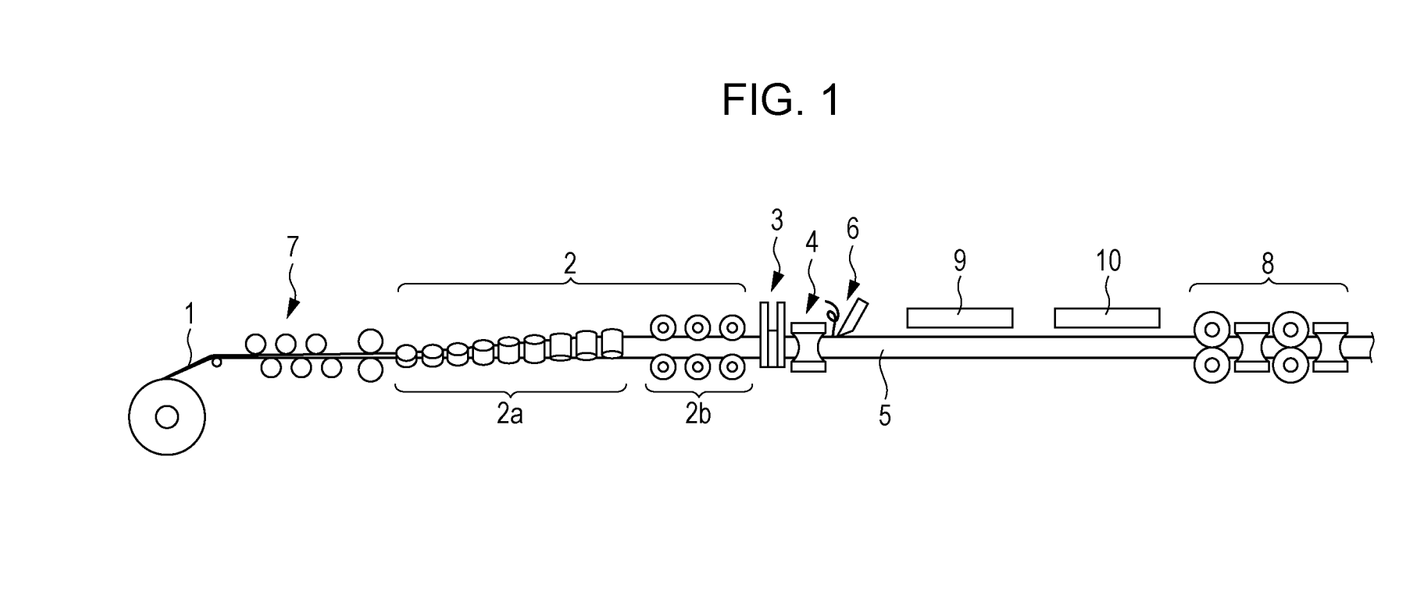
FIG. 1 is a schematic explanatory view of an example of a production line suitable for the manufacture of an electric-resistance-welded steel pipe according to the present disclosure.

A hot-rolled steel plate (hot-rolled steel strip) 1 having the composition and structure described above is used as a steel pipe material and is continuously rolled with a roll forming machine 2 illustrated in FIG. 1 to form an open pipe having a generally circular cross section. After that, the edges of the open pipe are butted against each other while butted edges of the open pipe are pressed to contact each other by squeeze rolls 4, the portion where the edges being butted are heated to at least the melting point thereof and are electric-resistance-welded with a welding machine 3 by high-frequency resistance heating, high-frequency induction heating, or the like, thus forming an electric-resistance-welded steel pipe 5. The roll forming machine 2 preferably includes a cage roll group 2a composed of a plurality of rolls and a fin pass forming roll group 2b composed of a plurality of rolls.

Figure 2:
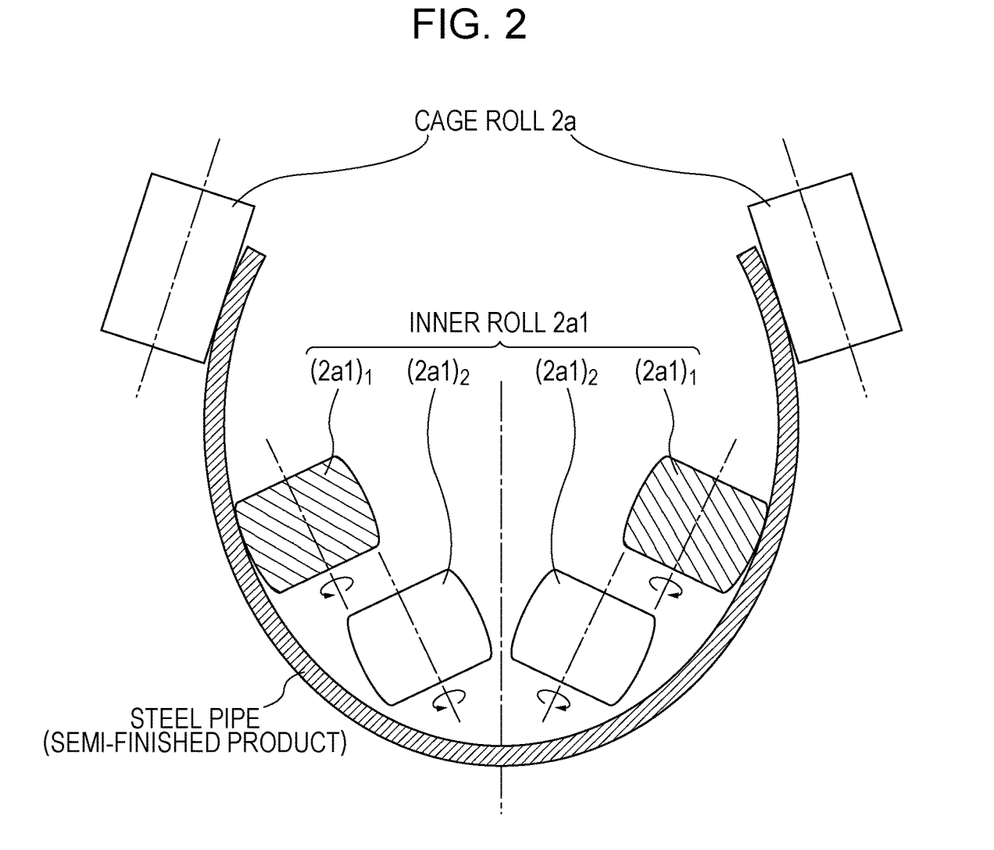
FIG. 2 is a schematic explanatory view of an example of the shape of inner rolls.

The circularity is preferably improved by pressing two or more portions of an inner wall of a hot-rolled steel plate with at least one set of inner rolls 2a1 disposed downstream of the cage roll group 2a during a forming process. Preferably, the inner rolls disposed have shape as illustrated in FIG. 2 so as to press two or more positions from the viewpoints of improving circularity and reducing the load to facilities.

Methods of roll forming, pressing by squeeze rolls, and electric resistance welding are not particularly limited, provided that an electric-resistance-welded steel pipe having predetermined dimensions can be manufactured, and any conventional method may be employed.

The electric-resistance-welded steel pipe thus formed is subjected to in-line heat treatment (seam annealing) of an electric-resistance-welded portion, as illustrated in FIG. 1.

Figure 3:
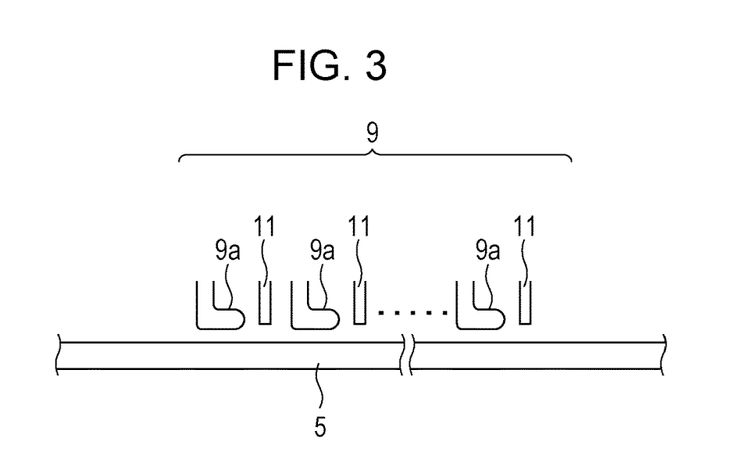
FIG. 3 is a schematic explanatory view of an example of in-line heat treatment facilities.

In-line heat treatment of an electric-resistance-welded portion is preferably performed with an induction heating apparatus 9 and a cooling apparatus 10 disposed downstream of the squeeze rolls 4 such that the electric-resistance-welded portion can be heated, for example, as illustrated in FIG. 1. As illustrated in FIG. 3, the induction heating apparatus 9 preferably includes one or a plurality of coils 9a so as to enable one or a plurality of heating steps. By using a plurality of coils 9a, uniform heating can be achieved.

In the heat treatment of an electric-resistance-welded portion, preferably, the electric-resistance-welded portion is heated so as to the minimum temperature in the thickness dirction being 830° C. or more and the maximum heating temperature in the thickness direction being 1150° C. or less and is cooled with water to a cooling stop temperature (at the center of plate thickness) of 550° C. or less such that the average cooling rate in the temperature range of 800° C. to 550° C. at the center of plate thickness ranges from 10° C./s or more and 70° C./s. The cooling stop temperature may be lowered. When the minimum heating temperature in an electric-resistance-welded portion is less than 830° C., the heating temperature may be too low to provide the desired structure of the electric-resistance-welded portion. On the other hand, a maximum heating temperature of more than 1150° C. may result in coarsening of crystal grains and reduced toughness. Thus, the heating temperature of an electric-resistance-welded portion in heat treatment preferably ranges from 830° C. to 1150° C.

When the cooling rate at the center of the plate thickness is less than 10° C./s, this may promote the formation of polygonal ferrite and result in an inability to provide the desired structure of an electric-resistance-welded portion. On the other hand, rapid cooling with a cooling rate of more than 70° C./s may result in the formation of a hard phase, such as martensite, an inability to provide the desired structure of an electric-resistance-welded portion, and reduced toughness. Thus, the average cooling rate of cooling after heating preferably ranges from 10° C./s to 70° C./s. The cooling stop temperature is preferably 550° C. or less. A high cooling stop temperature of more than 550° C. may cause incomplete ferrite transformation and formation of a coarse pearlite structure when left standing after cooling, and result in reduced toughness, or reduced strength.

The heat treatment (seam annealing) of an electric-resistance-welded portion can change the structure of the electric-resistance-welded portion into a structure similar to the structure of the base material portion, that is, a structure composed of 90% or more by volume of a bainitic ferrite phase as a main phase and 10% or less (including 0%) by volume of a second phase, the bainitic ferrite phase having an average grain size of 10 μm or less.

Subsequently, the circularity is improved by reducing rolling.

The reducing rolling is preferably cold rolling with a sizer 8 composed of two or three or more pairs of rolls. In the reducing rolling, a reduction ratio in the range of 0.2% to 3.3% is preferable. A reduction ratio of less than 0.2% may result in an inability to achieve the desired circularity (0.6% or less). On the other hand, a reduction ratio of more than 3.3% may cause excessive circumferential compression and considerable thickness variations in the circumferential direction, and result in reduced efficiency of girth welding. Thus, in the reducing rolling a reduction ratio in the range of 0.2% to 3.3% is preferable. The reduction ratio is calculated using the following formula.

Reduction ratio (%)={(outer perimeter of pipe before reducing rolling mm)−(outer perimeter of pipe after reducing rolling mm)}/(outer perimeter of pipe before reducing rolling mm)×100

The circularity of an end portion of a high-strength thick-walled electric-resistance-welded steel pipe can be adjusted to be 0.6% or less by the reducing rolling.

Exemplary embodiments are described below in the following examples.

EXAMPLES

A molten steel having the composition listed in Table 1 (the remainder was made up of Fe and incidental impurities) was produced in a converter and was cast into a slab (a cast block having a thickness of 250 mm) by a continuous casting process. The slab was used as steel that is a starting material.

The steel obtained was reheated under the conditions (heating temperature (° C.)×heating time (min)) listed in Table 2 and was hot-rolled into a hot-rolled steel plate. The hot rolling included rough rolling and finish rolling. The hot-rolling was performed under the conditions of the rolling reduction (%) in a non-recrystallization temperature range and the finishing delivery temperature (° C.) listed in Table 2. After the finish rolling, cooling was immediately started, and here, accelerated cooling, that is, cooling under the conditions of temperatures at the center of plate thickness (the average cooling rate in the temperature range of 750° C. to 650° C. and the cooling stop temperature) listed in Table 2 was performed. The resultant hot-rolled steel plate was coiled at a coiling temperature listed in Table 2 to produce a steel pipe material.

TABLE 3

| Steel No. | Chemical components (mass %) | | | | | | | | | | | Remarks |
|---|---|---|---|---|---|---|---|---|---|---|---|---|
| | C | Si | Mn | P | S | Al | N | Nb | Ti | V, Mo, Cr, Cu, Ni, B | Ca, REM | |
| A | 0.090 | 0.15 | 1.90 | 0.006 | 0.0050 | 0.034 | 0.003 | 0.037 | 0.010 | — | — | Working example |
| B | 0.054 | 0.15 | 1.74 | 0.012 | 0.0009 | 0.026 | 0.0003 | 0.060 | 0.015 | V: 0.08 | — | Working example |
| C | 0.050 | 0.20 | 1.55 | 0.012 | 0.0005 | 0.032 | 0.004 | 0.060 | 0.015 | Mo: 0.28, Cu: 0.22 Ni: 0.20 | — | Working example |
| D | 0.066 | 0.23 | 1.82 | 0.010 | 0.0016 | 0.037 | 0.004 | 0.063 | 0.016 | V: 0.04, Cr: 0.13 | — | Working example |
| E | 0.022 | 0.23 | 1.45 | 0.015 | 0.0022 | 0.026 | 0.002 | 0.055 | 0.014 | V: 0.07, Mo: 0.15, Cu:0.32 | Ca: 0.0025 | Working example |
| F | 0.040 | 0.18 | 1.60 | 0.010 | 0.0010 | 0.033 | 0.002 | 0.025 | 0.045 | Mo: 0.10, Ni: 0.25 | Ca: 0.0020 | Working example |
| G | 0.032 | 0.28 | 2.06 | 0.010 | 0.0019 | 0.040 | 0.003 | 0.053 | 0.012 | Mo : 0.37, Cr: 0.40, B: 0.0022 | REM:0.003 | Working example |
| H | 0.004 | 0.22 | 1.85 | 0.010 | 0.0010 | 0.030 | 0.003 | 0.032 | 0.020 | V: 0.075, Cu: 0.22 Ni: 0.24 | — | Comparative example |
| I | 0.146 | 0.20 | 1.44 | 0.012 | 0.0025 | 0.023 | 0.004 | 0.024 | 0.008 | V: 0.043 | Ca: 0.0011 | Comparative example |
| J | 0.042 | 0.56 | 1.58 | 0.005 | 0.0015 | 0.038 | 0.004 | 0.052 | 0.016 | Cr: 0.23, Ni: 0.15 | Ca: 0.0022 | Comparative example |
| K | 0.037 | 0.19 | 0.65 | 0.017 | 0.0008 | 0.021 | 0.003 | 0.080 | 0.017 | — | — | Comparative example |
| L | 0.036 | 0.35 | 2.31 | 0.012 | 0.0008 | 0.048 | 0.003 | 0.025 | 0.012 | Cu: 0.15, Ni: 0.13 | Ca: 0.0025 | Comparative example |

TABLE 3-continued

| Steel No. | Chemical components (mass %) | | | | | | | | | | Remarks |
|---|---|---|---|---|---|---|---|---|---|---|---|
| | C | Si | Mn | P | S | Al | N | Nb | Ti | V, Mo, Cr, Cu, Ni, B Ca, REM | |
| M | 0.050 | 0.27 | 1.36 | 0.006 | 0.0021 | 0.045 | 0.004 | 0.002 | 0.005 | V: 0.040 | — | Comparative example |
| N | 0.071 | 0.21 | 1.26 | 0.012 | 0.0006 | 0.031 | 0.003 | 0.131 | 0.015 | Mo: 0.18, Cr: 0.32 | — | Comparative example |
| O | 0.061 | 0.23 | 1.05 | 0.008 | 0.0007 | 0.041 | 0.001 | 0.015 | 0.065 | — | — | Comparative example |

Underlines indicate outside the scope of the present disclosure.

TABLE 2

| Hot-rolled plate No. | Steel No. | Hot rolling | | | | Cooling after hot rolling | | | Plate thickness (mm) | Remarks |
|---|---|---|---|---|---|---|---|---|---|---|
| | | Heating | | Rolling reduction in non-recrystallization temperature range* (%) | Finishing delivery temperature** (°C.) | Average cooling rate*** (°C.) | Cooling stop temperature*** (°C.) | Coiling temperature** (°C.) | | |
| | | Heating temperature (°C.) | Heating time (min) | | | | | | | |
| 1 | A | 1210 | 90 | 40 | 820 | 18 | 630 | 600 | 25.2 | Working example |
| 2 | B | 1210 | 75 | 40 | 810 | 20 | 620 | 610 | 20.4 | Working example |
| 3 | C | 1200 | 80 | 50 | 800 | 20 | 610 | 595 | 22.0 | Working example |
| 4 | D | 1220 | 90 | 20 | 820 | 16 | 650 | 620 | 25.2 | Working example |
| 5 | E | 1230 | 90 | 85 | 820 | 30 | 620 | 590 | 25.2 | Working example |
| 6 | F | 1180 | 65 | 55 | 780 | 22 | 630 | 595 | 20.4 | Working example |
| 7 | G | 1200 | 100 | 60 | 820 | 45 | 690 | 680 | 18.9 | Working example |
| 8 | H | 1200 | 100 | 20 | 820 | 25 | 650 | 620 | 18.9 | Comparative example |
| 9 | I | 1200 | 120 | 85 | 820 | 18 | 640 | 620 | 25.2 | Comparative example |
| 10 | J | 1190 | 75 | 40 | 780 | 28 | 670 | 650 | 15.7 | Comparative example |
| 11 | K | 1170 | 80 | 50 | 830 | 16 | 680 | 650 | 25.2 | Comparative example |
| 12 | L | 1200 | 80 | 20 | 820 | 20 | 680 | 650 | 22.0 | Comparative example |
| 13 | M | 1210 | 90 | 85 | 820 | 35 | 700 | 680 | 25.2 | Comparative example |
| 14 | N | 1210 | 90 | 40 | 820 | 20 | 660 | 650 | 20.4 | Comparative example |
| 15 | O | 1230 | 95 | 40 | 840 | 25 | 630 | 620 | 18.9 | Comparative example |
| 16 | A | 1100 | 100 | 50 | 820 | 18 | 610 | 600 | 25.2 | Comparative example |
| 17 | A | 1300 | 100 | 50 | 820 | 60 | 640 | 620 | 17.3 | Comparative example |
| 18 | A | 1230 | 105 | 20 | 820 | 5 | 660 | 650 | 22.0 | Comparative example |
| 19 | A | 1200 | 90 | 85 | 820 | 100 | 610 | 600 | 25.2 | Comparative example |
| 20 | A | 1200 | 95 | 40 | 780 | 18 | 820 | 800 | 25.2 | Comparative example |
| 21 | A | 1200 | 90 | 40 | 840 | 45 | 400 | 400 | 25.2 | Comparative example |
| 22 | C | 1280 | 100 | 50 | 820 | 25 | 635 | 630 | 18.9 | Comparative example |
| 23 | C | 1220 | 100 | 20 | 820 | 120 | 640 | 630 | 25.2 | Comparative example |
| 24 | C | 1210 | 110 | 85 | 820 | 20 | 780 | 750 | 20.4 | Comparative example |
| 25 | E | 1110 | 110 | 55 | 790 | 20 | 650 | 625 | 22.0 | Comparative example |
| 26 | E | 1180 | 100 | 60 | 820 | 3 | 620 | 595 | 25.2 | Comparative example |
| 27 | E | 1180 | 90 | 20 | 820 | 15 | 570 | 550 | 25.2 | Comparative example |
| 28 | F | 1100 | 90 | 20 | 800 | 15 | 630 | 620 | 25.2 | Comparative example |
| 29 | F | 1170 | 85 | 85 | 820 | 5 | 610 | 600 | 25.2 | Comparative example |
| 30 | F | 1190 | 75 | 40 | 820 | 25 | 750 | 720 | 18.9 | Comparative example |
| 31 | G | 1300 | 75 | 40 | 790 | 20 | 630 | 610 | 25.2 | Comparative example |
| 32 | G | 1200 | 80 | 50 | 820 | 100 | 650 | 630 | 15.7 | Comparative example |

*Temperature range of 930° C. or less
**Surface temperature
***Temperature at the center of plate thickness
Underlines indicate outside the scope of the present disclosure.

The hot-rolled steel plate serving as a steel pipe material was continuously cold-rolled with a roll forming machine including a cage roll group composed of a plurality of rolls and a fin pass forming roll group composed of a plurality of rolls, thereby forming an open pipe having a generally circular cross section. Then, the edges of the open pipe, which were opposite each other, were butted together. While butted edges of the open pipe were pressed to contact each other by squeeze rolls, the portion where the edges were butted was electric-resistance-welded to form an electric-resistance-welded steel pipe having a size listed in Table 3. In some electric-resistance-welded steel pipes, at least two portions, which were separate each other in the width direction, of the inner wall of the semi-formed product were pressed with inner rolls disposed downstream of the cage roll group.

The electric-resistance-welded portion of the electric-resistance-welded steel pipe was then subjected to in-line heat treatment under the conditions listed in Table 3. The in-line heat treatment was performed with an in-line heat treatment apparatus disposed downstream of the squeeze rolls. The in-line heat treatment apparatus included an induction heating apparatus and a water cooling apparatus. The average cooling rate and the cooling stop temperature were expressed in terms of a temperature at the center of plate thickness. The average cooling rate listed was an average cooling rate in the temperature range of 800° C. to 550° C.

The electric-resistance-welded steel pipe subjected to the in-line heat treatment was subjected to reducing-cold-rolling with a reducing rolling mill (sizer roll) at the reduction ratio listed in Table 3, thereby forming an electric-resistance-welded steel pipe having the dimensions listed in Table 3. The reducing rolling mill included 2 to 4 sets of rolls, as listed in Table 3. Some electric-resistance-welded steel pipes were not subjected to reducing rolling. The circularity of an end portion of a pipe was calculated using the formula (1). The outer diameters listed in Table 3 were nominal outer diameters.

material portion was polished and etched (etchant: nital) such that the observation surface was at the central position of the plate thickness, that is, at a center of the thickness, in a cross section in the longitudinal direction of the pipe (L cross section). The electric-resistance-welded portion was polished and etched (etchant: nital) such that the observation surface was a cross section in the circumferential direction of the pipe (C cross section). The structure was observed with a scanning electron microscope (SEM) (magnification: 1000), and images were taken in at least 2 fields. The structure images were analyzed to identify the structure and to determine the fraction of each phase. The area fractions thus determined were treated as the volume fractions.

Grain boundaries having an orientation difference of 15 degrees or more were determined by a SEM/electron back scattering diffraction (EBSD) method. The arithmetic mean of the equivalent circular diameters of the grains determined

TABLE 3

| | | | Heat treatment of electric-resistance-welded portion | | | Dimensions of steel pipe | | | | | |
| --- | --- | --- | --- | --- | --- | --- | --- | --- | --- | --- | --- |
| | Hot- | | Maximum | Average | | Reducing rolling | | | | Circularity | |
| Steel pipe No. | rolled plate No. | Steel No. | heating temperature (° C.) | cooling rate (° C./s) | Cooling stop temperature (° C.) | Number of rolls in sizer mill | Reduction ratio (%) | Thckness (mm) | Outer diameter (mmφ) | of end portion of pipe (%) | Remarks |
| 1 | 1 | A | 1120 | 15 | 450 | 2 | 0.4 | 25.4 | 558.8 | 0.45 | Working example |
| 2 | 2 | B | 1080 | 25 | 500 | 2 | 0.4 | 20.6 | 558.8 | 0.43 | Working example |
| 3* | 3 | C | 1100 | 20 | 500 | 3 | 0.5 | 22.2 | 558.8 | 0.32 | Working example |
| 4* | 4 | D | 1100 | 15 | 500 | 3 | 0.5 | 25.4 | 609.6 | 0.35 | Working example |
| 5 | 5 | E | 1090 | 15 | 480 | 4 | 0.4 | 25.4 | 558.8 | 0.27 | Working example |
| 6* | 6 | F | 1060 | 20 | 400 | 4 | 0.4 | 20.6 | 558.8 | 0.26 | Working example |
| 7* | 7 | G | 1050 | 25 | 450 | 8 | 0.3 | 19.1 | 660.4 | 0.15 | Working example |
| 8 | <u>8</u> | <u>H</u> | 1050 | 25 | 350 | 2 | 0.3 | 19.1 | 558.8 | 0.42 | Comparative example |
| 9 | <u>9</u> | <u>I</u> | 1080 | 15 | 350 | 2 | 0.5 | 25.4 | 558.8 | 0.45 | Comparative example |
| 10 | <u>10</u> | <u>J</u> | 1100 | <u>33</u> | 300 | 2 | 0.5 | 15.9 | 558.8 | 0.44 | Comparative example |
| 11 | <u>11</u> | <u>K</u> | 1120 | 15 | 480 | 4 | 0.5 | 25.4 | 558.8 | 0.33 | Comparative example |
| 12 | <u>12</u> | <u>L</u> | 1100 | 15 | 450 | 4 | 0.5 | 22.2 | 558.8 | 0.34 | Comparative example |
| 13 | <u>13</u> | <u>M</u> | 1020 | 15 | 500 | 4 | 0.5 | 25.4 | 558.8 | 0.29 | Comparative example |
| 14* | <u>14</u> | <u>N</u> | <u>1000</u> | 20 | 300 | 4 | 0.5 | 20.6 | 558.8 | 0.28 | Comparative example |
| 15 | <u>15</u> | <u>O</u> | 1040 | 30 | 300 | 4 | 0.5 | 19.1 | 457.2 | 0.28 | Comparative example |
| 16* | <u>16</u> | A | 1070 | 15 | 350 | 3 | 0.4 | 25.4 | 558.8 | 0.32 | Comparative example |
| 17 | <u>17</u> | A | 1075 | 30 | 400 | 2 | 0.4 | 17.5 | 609.6 | 0.42 | Comparative example |
| 18 | <u>18</u> | A | 1060 | 15 | 350 | 2 | 0.4 | 22.2 | 508.0 | 0.45 | Comparative example |
| 19 | <u>19</u> | A | 1050 | 15 | 350 | 2 | 0.4 | 25.4 | 609.6 | 0.42 | Comparative example |
| 20 | <u>20</u> | A | 1100 | 15 | 400 | 2 | 0.6 | 25.4 | 457.2 | 0.45 | Comparative example |
| 21 | <u>21</u> | A | 1100 | 15 | 300 | 2 | 0.6 | 25.4 | 558.8 | 0.44 | Comparative example |
| 22 | <u>22</u> | C | 1100 | 25 | 300 | 2 | 0.6 | 19.1 | 558.8 | 0.42 | Comparative example |
| 23 | <u>23</u> | C | 1120 | 15 | 350 | 2 | 0.6 | 25.4 | 558.8 | 0.40 | Comparative example |
| 24 | <u>24</u> | C | 1080 | 20 | 350 | 2 | 0.6 | 20.6 | 558.8 | 0.40 | Comparative example |
| 25 | <u>25</u> | E | 1070 | 20 | 400 | 2 | 0.6 | 22.2 | 508.0 | 044 | Comparative example |
| 26 | <u>26</u> | E | 1080 | 15 | 400 | 2 | 0.6 | 25.4 | 558.8 | 0.44 | Comparative example |
| 27 | <u>27</u> | E | 1060 | 15 | 380 | 2 | 0.5 | 25.4 | 558.8 | 0.44 | Comparative example |
| 28 | <u>28</u> | F | 1100 | 15 | 450 | 2 | 0.5 | 25.4 | 508.0 | 0.48 | Comparative example |
| 29 | <u>29</u> | F | 1100 | 20 | 440 | 2 | 0.5 | 25.4 | 558.8 | 0.38 | Comparative example |
| 30 | <u>30</u> | F | 1030 | 25 | 430 | 2 | 0.5 | 19.1 | 558.8 | 0.40 | Comparative example |
| 31 | <u>31</u> | G | 1100 | 20 | 470 | 2 | 0.5 | 25.4 | 558.8 | 0.41 | Comparative example |
| 32 | <u>32</u> | G | <u>990</u> | <u>55</u> | 450 | 2 | 0.4 | 15.9 | 558.8 | 0.40 | Comparative example |
| 33 | <u>17</u> | A | 1080 | 25 | 300 | — | — | 17.5 | 406.4 | <u>0.86</u> | Comparative example |

*With use of inner rolls
Underlines indicate outside the scope of the present disclosure.

Test pieces were taken from the electric-resistance-welded steel pipe and were subjected to structure observation, a tensile test, an impact test, and a post-weld heat treatment test. These test methods are described below.
(1) Structure Observation A test piece for structure observation was taken from a base material portion position at an angle of 90 degrees with respect to the electric-resistance-welded portion in the circumferential direction) and the electric-resistance-welded portion of the electric-resistance-welded steel pipe. The base was defined to be the average grain size of the main phase. "Orientation Imaging Microscopy Data Analysis", which is a software available from AMETEK Co., Ltd., was used for the calculation of the grain size.

Specimen for an electroextraction was taken from the base material portion of the electric-resistance-welded steel pipe (a position at an angle of 90 degrees with respect to the electric-resistance-welded portion in the circumferential direction) and was electrolyzed at a current density of 20 mA/cm$^2$ in an electrolyte solution (10% by volume acetylacetone-1% by mass tetramethylammonium chloride-methanol solution). The resulting electrolytic residue was dissolved in a liquid and was collected with an aluminum filter (pore size: 0.02 μm). The amount of Nb in the filtrate was measured by ICP spectroscopy and was considered to be the amount of precipitated Nb having a particle size of less than 20 nm. The ratio (%) of the amount of precipitated Nb to the total amount of Nb was calculated.

(2) Tensile Test

A plate-like tensile test piece was taken from the base material portion (a position at an angle of 180 degrees with respect to the electric-resistance-welded portion in the circumferential direction) and the electric-resistance-welded portion of the electric-resistance-welded steel pipe according to ASTM A 370 such that the tensile direction was a direction perpendicular to the longitudinal direction of the pipe (C direction). The tensile properties (yield strength YS and tensile strength TS) of the tensile test piece were measured.

(3) Impact Test

A V-notched test piece was taken from the base material portion (a position at an angle of 90 degrees with respect to the electric-resistance-welded portion in the circumferential direction) and the electric-resistance-welded portion of the electric-resistance-welded steel pipe according to ASTM A 370 such that the longitudinal direction of the test piece was the circumferential direction (C direction). The absorbed energy $vE_{-40}$ (J) each of three test pieces for a steel pipe was measured in a Charpy impact test at a test temperature of −40° C. The average value of the three measurements was considered to be the $vE_{-40}$ of the steel pipe.

(4) Post-Weld Heat Treatment Test

A test material was taken from the base material portion of the electric-resistance-welded steel pipe. The test material was placed in a heat treatment furnace maintained at a heating temperature simulating post-weld heat treatment listed in Table 5. When a predetermined holding time listed in Table 5 elapsed since the temperature of the test material reached (heating temperature −10° C.), the test material was removed from the heat treatment furnace and was left to cool. A plate-like tensile test piece was taken from the heat-treated test material according to ASTM A 370 such that the tensile direction was a direction perpendicular to the longitudinal direction of the pipe (C direction). The tensile properties (yield strength YS and tensile strength TS) of tensile test piece were measured.

Tables 4 and 5 show the results.

TABLE 4

| Steel pipe No. | Hot-rolled plate No. | Steel No. | Base material portion - Structure Type* | Fraction of main phase structure (area %) | Average grain size of main phase (μm) | Precipitated Nb ratio** | Strength Yield strength YS (MPa) | Tensile strength TS (MPa) | Toughness Absorbed energy vE −40 (J) | Electric-resistance-welded portion - Structure Type* | Fraction of main phase structure (vol %) | Average grain size of main phase (μm) | Strength Tensile strength TS (MPa) | Toughness Absorbed energy vE −40 (J) | Remarks |
|---|---|---|---|---|---|---|---|---|---|---|---|---|---|---|---|
| 1 | 1 | A | BF + P | BF: 96 | 5.6 | 85 | 602 | 692 | 214 | BF | 100 | 5.5 | 638 | 215 | Working example |
| 2 | 2 | B | BF + P | BF: 95 | 5.8 | 79 | 649 | 730 | 294 | BF | 100 | 5.4 | 650 | 225 | Working example |
| 3 | 3 | C | BF + P | BF: 97 | 7.7 | 78 | 590 | 678 | 305 | BF | 100 | 6.3 | 654 | 162 | Working example |
| 4 | 4 | D | BF + P | BF: 92 | 4.9 | 80 | 626 | 708 | 216 | BF | 100 | 6.5 | 674 | 196 | Working example |
| 5 | 5 | E | BF + P | BF: 97 | 5.8 | 85 | 628 | 695 | 290 | BF | 100 | 6.6 | 681 | 213 | Working example |
| 6 | 6 | F | BF + P | BF: 98 | 4.9 | 82 | 618 | 705 | 186 | BF | 100 | 6.8 | 671 | 214 | Working example |
| 7 | 7 | G | BF + P | BF: 95 | 4.7 | 89 | 751 | 870 | 135 | BF | 100 | 7.2 | 804 | 239 | Working example |
| 8 | 8 | H | BF + P | BF: 97 | 4.6 | 81 | 427 | 488 | 444 | BF | 100 | 7.0 | 656 | 157 | Comparative example |
| 9 | 9 | I | F + BF + P | F: 90 | 6.5 | 79 | 508 | 624 | 18 | B | 100 | 7.6 | 635 | 70 | Comparative example |
| 10 | 10 | J | BF + P | BF: 95 | 6.4 | 90 | 581 | 663 | 242 | BF | 100 | 7.6 | 658 | 16 | Comparative example |
| 11 | 11 | K | BF + P | BF: 81 | 13.2 | 87 | 550 | 624 | 314 | BF | 100 | 5.3 | 591 | 253 | Comparative example |
| 12 | 12 | L | BF + P | BF: 86 | 4.2 | 88 | 596 | 703 | 8 | BF | 100 | 5.1 | 642 | 24 | Comparative example |
| 13 | 13 | M | BF + P | BF: 95 | 8.0 | — | 510 | 585 | 333 | BF | 100 | 6.0 | 632 | 244 | Comparative example |
| 14 | 14 | N | BF + P | BF: 96 | 4.8 | 89 | 628 | 707 | 13 | BF | 100 | 6.1 | 663 | 194 | Comparative example |
| 15 | 15 | O | BF + F + P | BF: 92 | 6.0 | 87 | 634 | 640 | 8 | BF | 100 | 6.4 | 631 | 168 | Comparative example |
| 16 | 16 | A | BF + B | BF: 93 | 5.5 | 52 | 545 | 640 | 341 | BF | 100 | 6.5 | 643 | 184 | Comparative example |
| 17 | 17 | A | BF + B | BF: 81 | 12.1 | 87 | 600 | 689 | 17 | BF | 100 | 7.0 | 653 | 203 | Comparative example |
| 18 | 18 | A | F + P | F: 88 | 11.4 | 83 | 523 | 655 | 13 | BF | 100 | 6.6 | 680 | 226 | Comparative example |
| 19 | 19 | A | M + B | M: 52 | 3.3 | 91 | 615 | 765 | 15 | BF | 100 | 5.6 | 653 | 212 | Comparative example |
| 20 | 20 | A | F + P | F: 75 | 9.1 | 20 | 498 | 589 | 220 | BF | 100 | 5.5 | 640 | 235 | Comparative example |
| 21 | 21 | A | BF + B | BF: 85 | 4.8 | 55 | 563 | 644 | 388 | BF | 100 | 6.3 | 658 | 176 | Comparative example |
| 22 | 22 | C | BF + B | BF: 85 | 8.6 | 84 | 664 | 692 | 13 | BF | 100 | 6.2 | 629 | 169 | Comparative example |
| 23 | 23 | C | M + B | M: 58 | 4.3 | 85 | 539 | 720 | 19 | BF | 100 | 5.6 | 637 | 184 | Comparative example |
| 24 | 24 | C | F + P | F: 93 | 9.0 | 30 | 571 | 680 | 35 | BF | 100 | 5.4 | 631 | 232 | Comparative example |
| 25 | 25 | E | BF + P | BF: 95 | 4.5 | 25 | 495 | 565 | 414 | BF | 100 | 5.4 | 684 | 189 | Comparative example |
| 26 | 26 | E | F + P | F: 90 | 11.3 | 82 | 465 | 550 | 286 | BF | 100 | 6.2 | 661 | 132 | Comparative example |
| 27 | 27 | E | BF + B | BF: 91 | 5.2 | 65 | 541 | 650 | 303 | BF | 100 | 6.2 | 657 | 164 | Comparative example |
| 28 | 28 | F | BF + P | BF: 98 | 5.6 | 20 | 538 | 674 | 382 | BF | 100 | 6.7 | 655 | 183 | Comparative example |
| 29 | 29 | F | F + P | F: 89 | 11.9 | 84 | 500 | 583 | 326 | BF | 100 | 6.8 | 658 | 251 | Comparative example |
| 30 | 30 | F | F + P | F: 92 | 12.6 | 60 | 543 | 648 | 350 | BF | 100 | 7.0 | 665 | 208 | Comparative example |
| 31 | 31 | G | BF + P | BF: 95 | 10.9 | 94 | 684 | 890 | 18 | B | 100 | 7.1 | 821 | 194 | Comparative example |
| 32 | 32 | G | B + M | B: 65 | 5.4 | 88 | 744 | 895 | 19 | B | 100 | 7.5 | 821 | 176 | Comparative example |
| 33 | 17 | A | BF + P | BF: 80 | 12.0 | 85 | 594 | 690 | 15 | BF | 100 | 6.4 | 655 | 198 | Comparative example |

*BF: bainitic ferrite, B: bainite, P: pearlite, M: martensite, F: ferrite
**Amount of precipitated Nb: Amount of precipitated Nb having a particle size less than 20 nm (Ratio (%) relative to the total amount of Nb on a Nb equivalent basis)
Underlines indicate outside the scope of the present disclosure.

TABLE 5

| Steel pipe No. | Hot-rolled plate No. | Steel No. | Post-weld heat treatment conditions Heating temperature (° C.) | Holding time (h) | Strength after post-weld heat treatment Yield strength YS (MPa) | Tensile strength TS (MPa) | Difference in strength between before and after post-weld heat treatment ΔYS (MPa) | Remarks |
|---|---|---|---|---|---|---|---|---|
| 1 | 1 | A | 520 | 4 | 594 | 679 | −8 | Working example |
| 2 | 2 | B | 560 | 2 | 633 | 709 | −16 | Working example |
| 3 | 3 | C | 540 | 2 | 580 | 663 | −10 | Working example |
| 4 | 4 | D | 520 | 4 | 616 | 693 | −10 | Working example |
| 5 | 5 | E | 520 | 4 | 623 | 685 | −5 | Working example |
| 6 | 6 | F | 520 | 6 | 612 | 694 | −6 | Working example |
| 7 | 7 | G | 560 | 2 | 747 | 861 | −4 | Working example |
| 8 | <u>8</u> | <u>H</u> | 580 | 2 | 420 | 476 | −7 | Comparative example |
| 9 | <u>9</u> | <u>I</u> | 580 | 2 | <u>498</u> | <u>609</u> | −10 | Comparative example |
| 10 | <u>10</u> | <u>J</u> | 520 | 4 | 575 | 652 | −6 | Comparative example |
| 11 | <u>11</u> | <u>K</u> | 560 | 2 | <u>545</u> | <u>614</u> | −5 | Comparative example |
| 12 | <u>12</u> | <u>L</u> | 520 | 4 | 592 | 694 | −4 | Comparative example |
| 13 | <u>13</u> | <u>M</u> | 580 | 2 | <u>443</u> | <u>483</u> | −67 | Comparative example |
| 14 | <u>14</u> | <u>N</u> | 560 | 2 | 610 | 684 | −18 | Comparative example |
| 15 | <u>15</u> | <u>O</u> | 520 | 6 | 622 | 710 | −12 | Comparative example |
| 16 | <u>16</u> | A | 520 | 6 | <u>499</u> | <u>589</u> | −46 | Comparative example |
| 17 | <u>17</u> | A | 580 | 2 | 591 | 675 | −9 | Comparative example |
| 18 | <u>18</u> | A | 580 | 2 | <u>518</u> | 645 | −5 | Comparative example |
| 19 | <u>19</u> | A | 560 | 4 | 610 | 755 | −5 | Comparative example |
| 20 | <u>20</u> | A | 560 | 4 | <u>448</u> | <u>534</u> | −50 | Comparative example |
| 21 | <u>21</u> | A | 560 | 4 | <u>513</u> | <u>589</u> | −50 | Comparative example |
| 22 | <u>22</u> | C | 540 | 4 | 658 | 681 | −6 | Comparative example |
| 23 | <u>23</u> | C | 560 | 4 | <u>532</u> | 708 | −7 | Comparative example |
| 24 | <u>24</u> | C | 520 | 4 | <u>531</u> | 635 | −40 | Comparative example |
| 25 | <u>25</u> | E | 540 | 4 | <u>441</u> | <u>506</u> | −54 | Comparative example |
| 26 | <u>26</u> | E | 560 | 4 | <u>458</u> | <u>538</u> | −7 | Comparative example |
| 27 | <u>27</u> | E | 540 | 4 | <u>508</u> | <u>612</u> | −33 | Comparative example |
| 28 | <u>28</u> | F | 560 | 4 | <u>498</u> | 629 | −40 | Comparative example |
| 29 | <u>29</u> | F | 560 | 4 | <u>490</u> | <u>568</u> | −10 | Comparative example |
| 30 | <u>30</u> | F | 520 | 6 | <u>511</u> | 611 | −32 | Comparative example |
| 31 | <u>31</u> | G | 520 | 6 | 680 | 881 | −4 | Comparative example |
| 32 | <u>32</u> | G | 520 | 6 | 739 | 885 | −5 | Comparative example |
| 33 | <u>17</u> | A | 580 | 2 | 588 | 670 | −6 | Comparative example |

Underlines indicate outside the scope of the present disclosure.

All the working examples of the present disclosure are electric-resistance-welded steel pipes that are suitable for a deep-well conductor casing, have high strength of the API X80 grade, that is, a yield strength YS of 555 MPa or more and a tensile strength TS of 625 MPa or more, have good low-temperature toughness, suffer a smaller decrease in strength even after post-weld heat treatment, and have high resistance to post-weld heat treatment. The comparative examples outside the scope of the present disclosure are insufficient in strength, low-temperature toughness, or resistance to post weld heat treatment.

REFERENCE SIGNS LIST

1 Hot-rolled steel plate (hot-rolled steel strip)
2 Roll forming machine
3 Welding machine
4 Squeeze roll
5 Electric-resistance-welded steel pipe
6 Bead cutter
7 Leveler
8 Sizer
9 Induction heating apparatus
10 Cooling apparatus
11 Thermometer

The invention claimed is:

1. A high-strength thick-walled electric-resistance-welded steel pipe for a deep-well conductor casing, the steel pipe having a chemical composition consisting of:

C: 0.01% to 0.12%, by mass %;
Si: 0.05% to 0.50%, by mass %;
Mn: 1.0% to 2.2%, by mass %;
P: 0.03% or less, by mass %;
S: 0.005% or less, by mass %;
Al: 0.001% to 0.10%, by mass %;
N: 0.006% or less, by mass %;
Nb: 0.010% to 0.100%, by mass %;
Ti: 0.001% to 0.050%, by mass %;
optionally at least one Group selected from group consisting of A and B:
    Group A: at least one selected from the group consisting of:
        V: 0.1% or less, by mass %,
        Cr: 0.5% or less, by mass %,
        Ni: 1.0% or less, by mass %, and
        B: 0.0030% or less, by mass %, and
    Group B: at least one selected from the group consisting of:
        Ca: 0.0005% to 0.0050%, by mass %, and
        REM: 0.0005% to 0.0050%, by mass %; and
Fe and incidental impurities,
wherein the steel pipe has: (i) an electric-resistance-welded portion that has a tensile strength TS of 625 MPa or more and an absorbed energy $vE_{-40}$ in a Charpy impact test at a test temperature of −40° C. of 27 J or more, and (ii) a base material portion that has a yield strength YS of 555 MPa or more, a tensile strength TS of 625 MPa or more and an absorbed energy $vE_{-40}$ in a Charpy impact test at a test temperature of −40° C. of 27 J or more, the base material portion has a yield strength YS of 555 MPa or more and a tensile strength TS of 625 MPa or more after post-weld heat treatment performed at a temperature in a range of more than 500° C. and less than 600° C., the steel pipe has a structure in the electric-resistance-welded portion of the steel pipe, the structure composed of 90% or more by volume of a bainitic ferrite phase as a main phase and 10% or less by volume of a second phase, the bainitic ferrite phase having an average grain size of 10 μm or less, and the structure containing fine Nb precipitates having a particle size of less than 20 nm dispersed in the base material portion, a ratio of fine Nb precipitates to a total amount of Nb being more than 75% on a Nb equivalent basis, and a circularity of an end portion of the steel pipe defined by formula (1) being 0.6% or less, circularity (%)={(maximum outer diameter mmϕ of steel pipe)−(minimum outer diameter mmϕ of steel pipe)}/(nominal outer diameter mmϕ)×100    formula (1).

2. The high-strength thick-walled electric-resistance-welded steel pipe for a deep-well conductor casing according to claim 1, wherein C: more than 0.04% to 0.12%, by mass %.

3. The high-strength thick-walled electric-resistance-welded steel pipe for a deep-well conductor casing according to claim 1, wherein the absorbed energy of the electric-resistance-welded portion is 162 J or more, and the absorbed energy of the base material portion is 135 J or more.

4. A method for manufacturing the high-strength thick-walled electric-resistance-welded steel pipe for a deep-well conductor casing according to claim 1, the method comprising:

continuously rolling a hot-rolled steel plate having the chemical composition with a roll forming machine to form an open pipe having a circular cross section;

butting edges of the open pipe;

electric-resistance-welding a portion where the edges are being butted while pressing the butted edges to contact each other by squeeze rolls to form an electric-resistance-welded steel pipe;

subjecting the electric-resistance-welded portion of the electric-resistance-welded steel pipe to in-line heat treatment; and reducing a diameter of the electric-resistance-welded steel pipe by rolling, wherein:

the hot-rolled steel plate is manufactured by:

heating to soak a steel at a heating temperature in the range of 1150° C. to 1250° C. for 60 minutes or more, hot-rolling the steel with a finishing delivery temperature of 750° C. or more, after completion of the hot rolling, subjecting the hot-rolled steel plate to accelerated cooling such that an average cooling rate in a temperature range of 750° C. to 650° C. at the center of plate thickness ranges from 8° C./s to 70° C./s, and coiling the hot-rolled steel plate at a coiling temperature of more than 580° C. and 700° C. or less.

5. The method for manufacturing a high-strength thick-walled electric-resistance-welded steel pipe for a deep-well conductor casing according to claim 4, wherein the roll forming machine includes a cage roll group composed of a plurality of rolls and a fin pass forming roll group composed of a plurality of rolls.

6. The method for manufacturing a high-strength thick-walled electric-resistance-welded steel pipe for a deep-well conductor casing according to claim 5, wherein two or more portions of an inner wall of the hot-rolled steel plate are pressed with an inner roll disposed downstream of the cage roll group during a forming process.

7. The method for manufacturing a high-strength thick-walled electric-resistance-welded steel pipe for a deep-well conductor casing according to claim 4, wherein the in-line heat treatment of the electric-resistance-welded portion includes heating the electric-resistance-welded portion to a heating temperature in the range of 830° C. to 1150° C. and cooling the electric-resistance-welded portion to a cooling stop temperature of 550° C. or less at the center of the plate thickness such that an average cooling rate in a temperature range of 800° C. to 550° C. at the center of the plate thickness ranges from 10° C./s to 70° C./s.

8. The method for manufacturing a high-strength thick-walled electric-resistance-welded steel pipe for a deep-well conductor casing according to claim 4, wherein a reduction ratio in the reducing rolling is in the range of 0.2% to 3.3%.

9. The method for manufacturing a high-strength thick-walled electric-resistance-welded steel pipe for a deep-well conductor casing according to claim 7, wherein a reduction ratio in the reducing rolling is in the range of 0.2% to 3.3%.

10. A high-strength thick-walled conductor casing for deep wells, the conductor casing comprising a screw member disposed on each end of the high-strength thick-walled electric-resistance-welded steel pipe for a deep-well conductor casing according to claim 1.

* * * * *